A. C. VELO.
DISAPPEARING AUTOMOBILE TOP.
APPLICATION FILED JUNE 25, 1920.
1,426,129.
Patented Aug. 15, 1922.
2 SHEETS—SHEET 1.
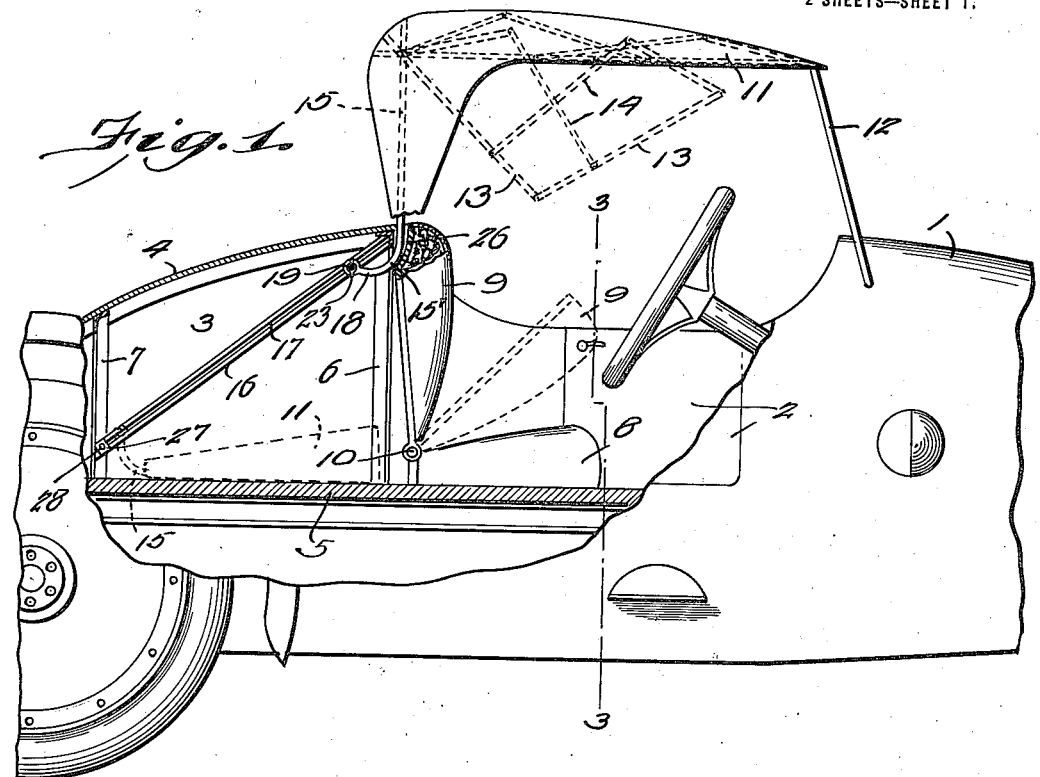
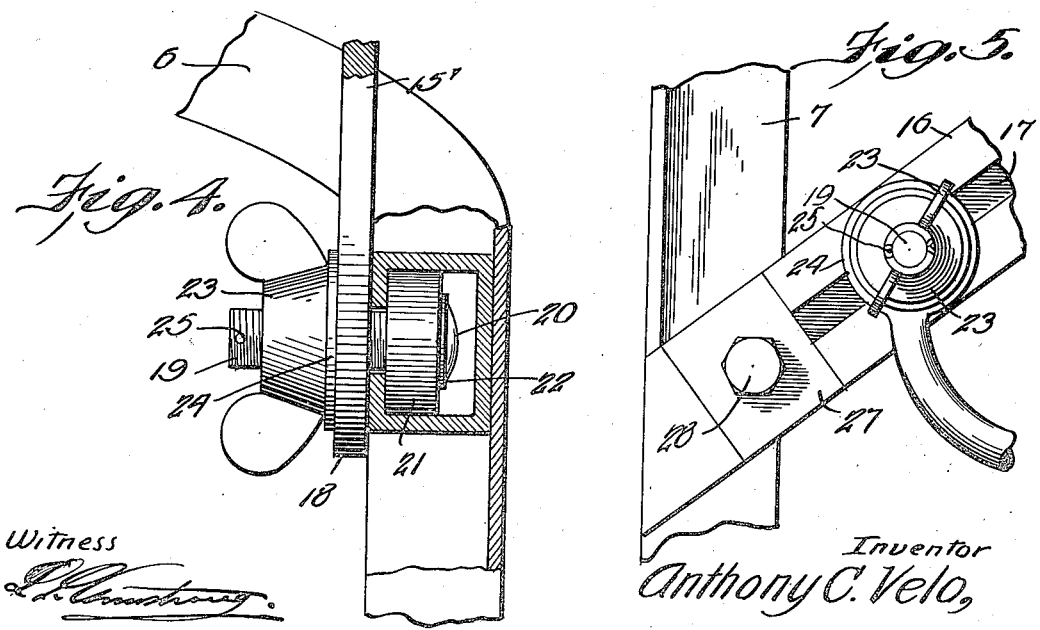
Witness
Inventor
Anthony C. Velo,
By
Attorney A. C. VELO.
DISAPPEARING AUTOMOBILE TOP.
APPLICATION FILED JUNE 25, 1920.
1,426,129.
Patented Aug. 15, 1922.
2 SHEETS—SHEET 2.
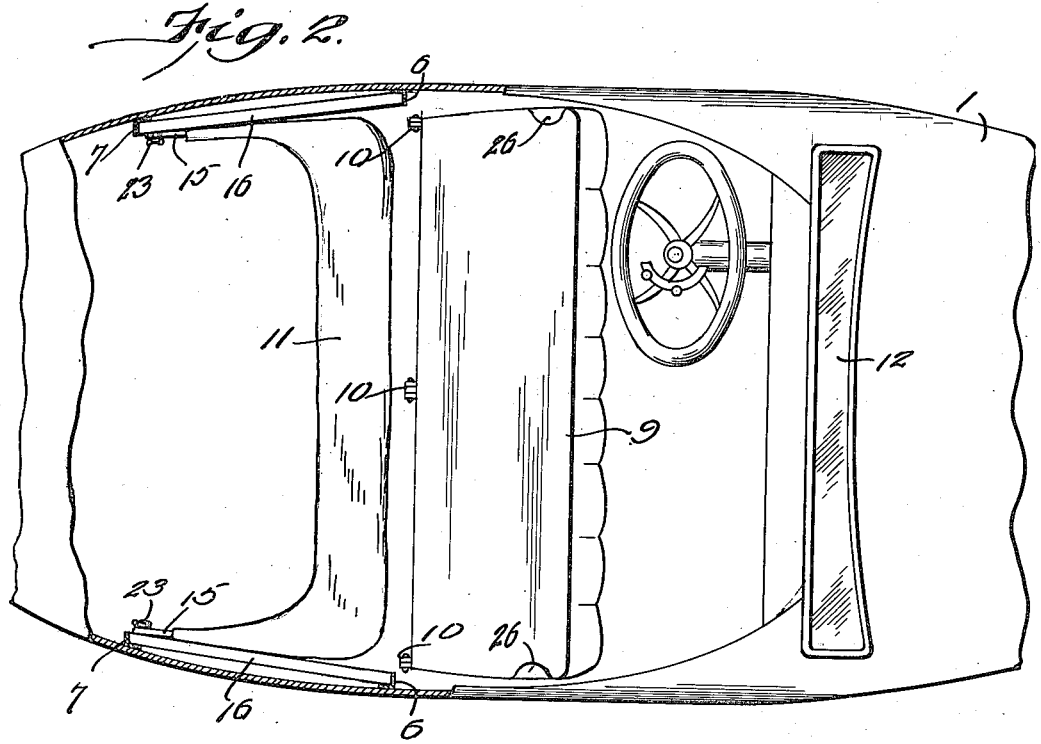
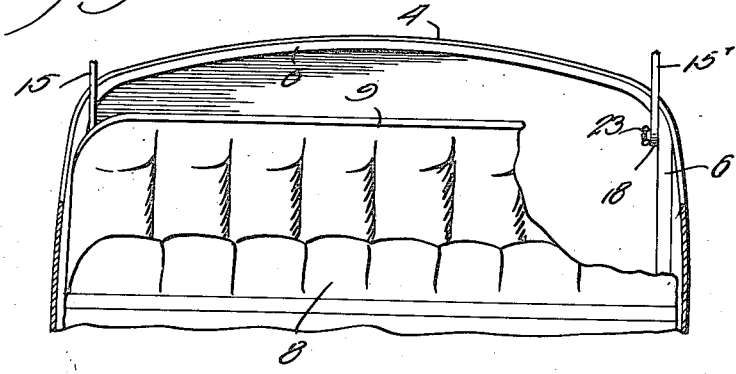

UNITED STATES PATENT OFFICE.

ANTHONY C. VELO, OF NEW YORK, N. Y., ASSIGNOR OF ONE-HALF TO FREDERICK TRINCA, OF WEST NEW YORK, NEW JERSEY.

DISAPPEARING AUTOMOBILE TOP.

1,426,129.     Specification of Letters Patent.     Patented Aug. 15, 1922.

Application filed June 25, 1920. Serial No. 391,597.

*To all whom it may concern:*

Be it known that I, ANTHONY C. VELO, a citizen of the United States, residing at New York, in the county of New York and State of New York, have invented new and useful Improvements in Disappearing Automobile Tops, of which the following is a specification.

This invention relates to a disappearing top for automobiles, and its main object is to provide novel means for mounting the top upon the automobile body and novel means for its reception within the automobile body, whereby a type of folding top is produced which may be easily and conveniently let down and compactly folded into a compartment formed in the body, so as to be substantially or entirely concealed from view when its use is not desired or required.

A further object of the invention is to provide a folding top having slidable and pivotal engagement at its rear with guides arranged within its receiving compartment in the body, whereby the top is adapted when freed for folding movement and folded to be slid downwardly within the compartment and disposed so as to lie snugly and compactly therein.

A still further object of the invention is to provide a compartment of the character described for receiving the folded top, and which is adapted to be normally closed by a seat back on the vehicle, said seat back being arranged to be swung forward to open or expose the compartment for the insertion or removal of the top and to be swung back to a normal position in which it closes the compartment and conceals the stored top from view.

A still further object of the invention is to provide novel means for mounting the folding top so as to provide for its ready movement into and out of the compartment and its detachment and removal from the vehicle when occasion requires.

The invention consists of the features of construction, combination and arrangement of parts, hereinafter fully described and claimed, reference being had to the accompanying drawings, in which:

Figure 1 is a fragmentary side elevation of an automobile of the roadster type to which my invention is shown in the present instance applied, portions of the vehicle being broken away and sectioned to show the interior construction.

Figure 2 is a sectional plan view of the same showing the folded top stored within its receiving compartment and the seat back moved forward to open position.

Figure 3 is a cross section taken substantially on the line 3—3 of Figure 1 and showing the seat back tilted forward and partially broken away.

Figure 4 is a detail section through one of the channeled guides showing the slidable and pivotal connection therewith of one of the supporting arms of the folding frame.

Figure 5 is a side elevation of the parts shown in Figure 4.

Referring to the drawings, 1 designates the body of an automobile having a front compartment 2 for the driver and a passenger or passengers, if any, and a rear compartment 3 enclosed except at the front by the side walls and tail deck 4 of the body, said compartments being shown as provided with a common base or floor 5. The portions of the body forming the compartment 3 are suitably reinforced, the reinforcing means including spaced inverted U-shaped or arched angle iron braces 6 and 7, the arched brace 6 being arranged at the open forward portion of the compartment 6.

Arranged within the compartment 2 is a seat 8 having a back rest 9. This back rest 9 is hinged, as at 10, to the frame of the seat 8 so as to allow it to be swung forward to the dotted line position shown in Figure 1 or swung rearwardly to the full line position shown therein. When in the full line position the seat back 9 covers and closes the front of the compartment 3, and when in the dotted line position said seat back uncovers or exposes the open front of said compartment for the purpose of enabling the disappearing top to be moved into or out of said compartment, as hereinafter described. The seat back 9 has its upper edge arranged to normally come flush with the top of the front edge of the deck 4 and abut thereagainst to form a close joint when the compartment 3 is closed, and said seat back may be secured in closed position by any suitable fastening means, or it may tilt rearwardly to a sufficiently inclined position to be maintained in such position by gravity to normally keep the compartment 3 closed.

The top 11 may in general be of any one of the several constructions in common use, with the exception of such features of construction as are provided for the purpose of mounting it in accordance with my invention. As an example, the top 11 may be an ordinary one-man type of folding top adapted to be supported at its lower rear edge upon the vehicle body and to be detachably secured when in extended position at its forward edge to the wind shield 12. The particular type of top 11 shown is adapted when released from connection with the wind shield to fold substantially along horizontal transverse lines and so that the normally horizontal forward portion of the top will fold parallel with the normally vertical rear portion thereof. The frame of the folding top includes the jointed bow sectons 13 and braces 14 and in addition a rear frame bow having vertical arms 15. These arms are generally pivoted at their lower ends to the body of the vehicle so as to permit the folded top to swing over upon the rear deck of the body in a vehicle of the type shown. According to my invention, the top when folded is designed to be swung downwardly into the compartment 3, as shown in dotted lines in Figure 1, so that when not in use the top will be protected and concealed from view.

Arranged within the compartment 3 are guides 16 each comprising a channeled iron of rectangular cross section, provided upon its inner side with a longitudinal slot 17. A guide 16 is arranged at each side of the compartment 3 and said guides extend downwardly and rearwardly at an angle from the top of the entrance to said compartment and are secured to the braces 6 and 7. The vertical arms 15 of the rear frame bow of the folding top 11 are formed with eyes 18 for the passage of a bolt 19 having a headed inner end 20 arranged within the channeled guide 16 and carrying a friction roller 21 and a washer 22 disposed between said head and the adjacent side of said friction roller. The eye 18 is arranged to bear against the slotted side of the guide 16 and is threaded to receive a winged clamping nut 23, and disposed between said nut and the eye 18 is a split spring washer 24 adapted to bind frictionally upon the nut when the latter is tightened up to hold the nut from casual turning and becoming loosened. The inner end of the bolt may be pierced for the passage of a cotter or other stop pin 25 to limit the normal exten of movement of the nut when turned for a releasing action. By the construction described it will be understood that the lower ends of the arms 15 are pivotally connected with the bolts 19 which are in turn slidably mounted on the channeled guides 16. From this it will be evident that upon folding the top 11, and swinging the seat back 9 downwardly and forwardly to the dotted line position in Figure 1, the folded top, when released for swinging movement by loosening the nuts 23, will swing by gravity downwardly and rearwardly into the compartment 3 and, through the sliding action of the bolts in the channeled guides 16, move downwardly and rearwardly in said compartment until it is fully stored therein and rests in reversed or inverted position upon the floor 5, as shown in dotted lines in Figure 1. When the top is thus folded and stored in the compartment 3 it will be entirely concealed from view upon swinging the seat back 9 upwardly and rearwardly to its normal position in which it closes the front of the compartment 3. When it is desired to withdraw and raise the top for use, this may be done by swinging the seat back 9 downwardly and forwardly to open position, so that upon grasping the folded top it may be drawn outwardly until the arms 15 are again disposed in the full line position shown in Figure 1, whereupon the bolts 19 may be locked in fixed position and the top opened and secured to the wind shield 12 in an obvious manner. It will, of course, be understood that when the nuts 23 are tightened the friction rollers 21 will be clamped against the inner sides of the slotted walls of the channeled guides and the eyes 18 of the arms 15 against the outer sides of said wall, thus fixing the frame of the top in adjusted position, but that upon relaxing the nuts 23 the arms 15 may be freed for pivotal movements on the bolts 19 and the friction rollers 21 for revoluble movement on said bolts, thus adapting the top to be swung upwardly or downwardly and the pivotal connections to slide longitudinally of the channeled guideways, in which operation the friction rollers will run along the guideways and make the operation free and easy. Thus it will be apparent that when the top is folded and the wing nuts relaxed the weight of the top itself will be sufficient to cause it by gravity to swing downward and travel along the channeled guideways into the compartment 3, thus adapting it to be folded with very little manual exertion on the part of the operator, while the freedom of pivotal motion allowed by the travel of the friction rollers adapts the top to be drawn outward and swung upward for opening movement in a ready and convenient manner.

In order to adapt the lower ends of the arms to clear the horizontal portion of the brace 6, said arms are preferably curved or made of goose-neck form, as shown at 15', so that when the top is in use said goose-neck portions may extend below and under such portion of the brace for pivotal connection as described with the guideways 16. These curved or goose-neck lower ends of the arms 15 also adapt the folded top to swing downward and rest upon the floor 5 within the compartment, as will be readily understood. For the purpose of accommodating the lower ends of the arms 15 when the seat back 9 is closed, the upper rear portion of the seat back is preferably provided with grooves or recesses 26 for such purpose, this construction also allowing the seat back to close at its upper edge snugly against the forward edge of the rear deck 4. The lower rear ends of the channeled guides 16 are closed by blocks 27 detachably secured in position by screws 28. Such ends of the bars are arranged to terminate at a point in advance of the rear wall of the compartment 3, so that upon removal of the blocks 28 the pivot bolts 19 may be slid out of the lower rear ends of the channeled guides, permitting the folded top to be detached and removed as an entirety from the vehicle. This construction also adapts the top to be applied for use in a ready, convenient and obvious manner.

From the foregoing description, the construction and mode of operation of my invention will be readily understood, and it will be seen that the invention provides a top which is of a disappearing type, that is to say, is adapted to be folded and entirely concealed within the body of the vehicle when its use is not desired. By this means the top, when not in use, may be protected from dirt, dust and the action of the elements and the exterior of the body left clear of the incumbrance of a projecting folded top, with the result of making a much better appearance. By mounting the seat back 9 in the manner described, and utilizing it as a closure for the compartment 3, a convenient means for securing this result is obtained without the use of an auxiliary closure. It will, of course, be understood that various modifications within the spirit and scope of the invention may be made, and that any type of top adapted to fold in close compass so that it may be stored as described within the compartment 3 may be employed. Other changes and modifications in the general construction and arrangement of parts may also be resorted to within the scope of my invention as set forth in the appended claims.

It will be observed that the folding top occupies but a comparatively small amount of space in the compartment 3, so that said compartment may also be used for general storage purposes.

Having thus fully described my invention, I claim:

1. In a disappearing top for automobiles, the combination of an automobile body having a seat compartment and a storage compartment, said storage compartment being provided with a forward, vertical entranceway facing said seat compartment, a seat within the seat compartment having a hinged back movable forwardly and rearwardly to open and close the said entranceway to said storage compartment, downwardly and rearwardly inclined guides within the storage compartment, pivot members slidably engaging said guides, a folding top including a frame having arms pivotally engaging said pivot members and slidable therewith along said inclined guides, whereby the folded top may be swung downwardly through the entranceway into said compartment and caused to travel along said guides so as to be received in said storage compartment and rest upon the floor thereof, and means coacting with said pivot members to secure the same against sliding movement upon the guides and to secure the top against pivotal motion on said pivot members.

2. In a disappearing top for automobiles, the combination of an automobile body having a seat compartment and a storage compartment in rear thereof, said storage compartment being provided at its forward portion with a vertically disposed entranceway, a closure for the said entranceway of said storage compartment, guides at the sides of the storage compartment extending downwardly and rearwardly from the upper forward portion thereof, pivot members slidably engaging said guides a folding top having arms pivotally engaging said pivot members and slidable therewith along said guides, said top being adapted to swing in a vertical arc on said pivot members into and out of the storage compartment through said entranceway and to slide with said pivot members along said guideways for complete movement of the folded top into or out of the storage compartment, and means cooperating with said pivot members for clamping the same against sliding movement on the guides and for also securing the arms of the top against pivotal movement on said pivot members.

3. In a disappearing top for automobiles, the combination of an automobile body having a seat compartment and a storage compartment in rear thereof, said storage compartment being provided at the front thereof with a vertically disposed entranceway, channeled guide members arranged at opposite sides of the storage compartment and extending downwardly and rearwardly at an angle from the forward portion thereof, said guides having longitudinal slotted walls, pivot members slidably mounted on the guides and having roller bearings to travel upon the interior thereof and portions projecting through the slots in the guides, a folding top having supporting arms pivotally engaging the projecting portions of the pivot members, said top being adapted to swing in a vertical arc on said pivot members into and out of the storage compartment through said vertical entranceway and to slide with the pivot members longitudinally of said guides, and means engaging the projecting portions of the pivot members and the supporting arms of the frame for conjointly clamping said arms against pivotal motion on the pivot members and clamping the pivot members against sliding motion on the guides.

4. In a disappearing top for automobiles, the combination of an automobile body having a seat compartment and a storage compartment in rear thereof, said storage compartment having at its forward end a vertically disposed entranceway opening into said seat compartment, guides arranged within the storage compartment at the sides thereof and extending downwardly and rearwardly at an angle from the upper forward portion of said compartment, pivot members slidably engaging said guides, a seat within the seat compartment, a hinged back for said seat movable forwardly and rearwardly to open and close the entranceway to the storage compartment, said seat back being provided with recesses in the upper portion of its rear face, a folding top having supporting arms provided with goose-neck portions pivotally engaging the sliding pivot members, said goose-neck portions adapted to extend through said recesses in the hinged back into the storage compartment when the top is in operative position and to permit the top to swing downwardly upon the floor of the storage compartment when said top is housed in the latter, and means for holding the supporting arms of the top from pivotal movement on the pivot members and for also holding said pivot members from sliding movement on the inclined guides.

5. In a disappearing top for automobiles, the combination of an automobile body having a seat compartment and a storage compartment in rear thereof, said storage compartment being provided at its forward portion with a vertically disposed entranceway communicating with the seat compartment, a closure for said entranceway movable between open and closed positions, channeled guides at the sides of the storage compartment extending downwardly and rearwardly from the upper front portion of said compartment to a point close to but in advance of the rear wall of said compartment, detachable closures for the lower rear ends of said channeled guides, pivot members slidably movable in said guides and insertable and removable at the rear ends thereof when said detachable closures are detached, a folding top having supporting arms pivotally engaging said pivot members, and means for securing said arms against pivotal movement on said pivot members and for securing the pivot members against sliding motion on the guides.

6. In a disappearing top for automobiles, the combination of an automobile body having a seat compartment and a storage compartment in rear thereof, said storage compartment being provided at its forward end with a vertically disposed entranceway communicating with the seat compartment, a seat within the seat compartment having a seat back movable forwardly and rearwardly and adapted when in normal condition to form a closure for the entranceway of the storage compartment, interconnected arched braces disposed at the front and rear of the storage compartment and extending from side to side thereof, channeled guides at the sides of the storage compartment and extending at a downward and rearward angle of inclination between and secured to the front and rear arched braces, pivot members slidable along said guides, a folding top provided with supporting arms pivotally engaging said pivot members and slidable with the latter along the guides, and means for securing the top against pivotal motion on the pivot members and securing said pivot members against sliding motion on the guides.

7. In a disappearing top for automobiles, the combination of an automobile body having a seat compartment and a storage compartment in rear thereof, the floors of said compartment extending in a common plane and said seat compartment having at its forward end a vertically disposed entranceway communicating with the seat compartment, a seat within the seat compartment, a hinged back for said seat adapted when in normal position to close the entranceway to the storage compartment and movable forwardly from such position to uncover said entranceway, guides arranged at the sides of the storage compartment and extending at a downward and rearward angle therein, pivot members slidably engaging said guides, a folding top pivotally engaging said pivot members for swinging movement thereon and adapted for sliding motion with said pivot members on said inclined guides, whereby the top is adapted when folded to be swung vertically on the pivot members on an arc into and out of the storage compartment through the entranceway thereof and is adapted to slide longitudinally with the pivot members on said guides so as to move clearly into and out of said storage compartment, the arrangement being such that the folded top is adapted when swung downwardly into the compartment and slid along the guides to drop upon the floor of said compartment, and means for securing the top against pivotal motion on the pivot members and for securing said pivot members against sliding motion on the guides.

8. In a disappearing top for automobiles, the combination of an automobile body provided with a seat compartment and a storage compartment in rear thereof, said storage compartment having an open front facing said seat compartment, a closure member movable to cover and uncover the open front of the storage compartment, guides at the sides of the storage compartment extending downwardly and rearwardly at an angle from a point at or adjacent to the top of the open front of said compartment to a point at or adjacent to the bottom of said compartment at the rear thereof, and a folding top including a rear frame bow and a folding frame structure adapted to fold substantially in parallel relation to said rear bow, said rear bow having arms slidably and pivotally engaging said inclined guides, whereby the folded top is adapted to be swung downwardly from a raised position into the seat compartment facing the open front of the storage compartment and caused to move into the storage compartment by the travel of the arms in an inclined plane along said guides.

In testimony whereof I affix my signature.

ANTHONY C. VELO.